(12) United States Patent
Danforth et al.

(10) Patent No.: US 7,844,736 B2
(45) Date of Patent: Nov. 30, 2010

(54) SYSTEM AND METHOD FOR RESOLVING MTA DOMAIN NAMES

(75) Inventors: Andrew Danforth, Herndon, VA (US); Clayton O'Neill, Fairfax, VA (US)

(73) Assignee: Time Warner Cable, Inc., New York, NY (US)

( * ) Notice: Subject to any disclaimer, the term of this patent is extended or adjusted under 35 U.S.C. 154(b) by 455 days.

(21) Appl. No.: 11/873,668

(22) Filed: Oct. 17, 2007

(65) Prior Publication Data

US 2009/0106213 A1    Apr. 23, 2009

(51) Int. Cl.
*G06F 15/16* (2006.01)
(52) U.S. Cl. .................. 709/245; 709/220; 709/221; 707/10
(58) Field of Classification Search .................. 709/220
See application file for complete search history.

(56) References Cited

U.S. PATENT DOCUMENTS

| | | | | |
|---|---|---|---|---|
| 2003/0133450 A1* | 7/2003 | Baum | ..... | 370/389 |
| 2003/0200311 A1* | 10/2003 | Baum | ..... | 709/224 |
| 2003/0211839 A1* | 11/2003 | Baum et al. | ..... | 455/403 |
| 2004/0071164 A1* | 4/2004 | Baum | ..... | 370/469 |
| 2004/0111640 A1* | 6/2004 | Baum | ..... | 713/201 |
| 2006/0002308 A1* | 1/2006 | Na et al. | ..... | 370/252 |
| 2006/0031921 A1* | 2/2006 | Danforth et al. | ..... | 726/1 |
| 2006/0112176 A1* | 5/2006 | Liu et al. | ..... | 709/223 |
| 2008/0092228 A1* | 4/2008 | Baum | ..... | 726/13 |
| 2008/0320003 A1* | 12/2008 | Heinson et al. | ..... | 707/10 |

\* cited by examiner

*Primary Examiner*—Firmin Backer
*Assistant Examiner*—Natisha Cox
(74) *Attorney, Agent, or Firm*—The Marbury Law Group, PLLC

(57) ABSTRACT

A MAC-to-IP system receives IP and/or MAC lease information of network end-points from one or more DHCP servers providing services to a region of a multi-system subscriber access network. The lease information includes the MAC and IP addresses of devices that can be provisioned by a DHCP server serving the particular region as well as lease expiration information (i.e., time and date). The lease information can be extracted from issued leases and does not affect the issuance of leases by the DHCP server. A DNS-to-MAC-to-IP query interface receives a DNS lookup request for a network end-point from a network device and converts the DNS lookup request into a MAC-to-IP database query. Data is obtained from the MAC-to-IP database to fulfill the DNS lookup request and DNS lookup response is created and sent to the requesting network device.

12 Claims, 3 Drawing Sheets

SYSTEM AND METHOD FOR RESOLVING MTA DOMAIN NAMES

BACKGROUND AND SUMMARY

For most of the last century, telephone communications were exclusively handled through circuit switched networks (generically identified as the public switched telephone network or "PSTN"). Circuit switching establishes a connection between a calling party and a called party. If all goes well, the circuit is maintained until the call terminates.

With the development of packet switching and the growth of the Internet, voice communication using packet switching technology has become an attractive alternative to the PSTN. Referred to as voice over Internet Protocol or "VoIP," the technology to make packet-based voice services is evolving rapidly. Operators of subscriber access networks (SANs), including cable and fiber network operations, as well as local phone companies, Internet service providers (ISPs), and independent service companies (among others) are offering telephone services that can manage calls that originate and terminate on packet switched networks while also allowing VoIP calls to be terminated on, or initiated from, the PSTN.

FIG. 1 illustrates the logical elements of a SAN-based service. The SAN as illustrated utilizes a regional data center (RDC), RDC 1 128. Other regional data centers may be established by the operator of the cable network. The RDC 1 128 is connected to the managed IP network 115.

Managed IP network 115 is shown connected to a modem termination system (MTS) 120. A subscriber's modem 105 and multimedia (or media) terminal adapter (MTA) 110 connect to the MTS 120, which may be located at a headend (not illustrated). The MTA 110 handles voice compression, packetization, security, and call signaling to support a standard telephone 100 through an RJ-11 connector. An MTA 110 may be designed to be either a separate standalone device or to be embedded within modem 105. The MTA 110 and the modem 105 are each assigned both a media access control (MAC) and an IP address, even if integrated into a single device. The MTA 110 includes an interface to a physical voice device, e.g., a telephone. Additionally, the MTA includes a network interface, CODECs, and other circuitry necessary for processing telephony signals and IP packets. Logically, modem 105 is an "end-point" for high speed data service and MTA 110 is an end-point for digital telephone service. An end-point device is a network device that requires configuration and provisioning by the SAN in order to be permitted to communicate over the SAN. Other end-point devices include home gateway devices that provide connectivity between the SAN and home LANs and devices that provide video services to televisions and monitors.

As illustrated, cable modem (CM) 105, MTA 110, and MTS 120 are associated with RDC 1 128. Thus, RDC 1 128 is responsible for provisioning CM 105 and MTA 110. As part of this provisioning process, Dynamic Host Configuration Protocol (DHCP) server 140 provides DHCP services to modem 105 and MTA 110.

FIG. 1 also illustrates a number of logical components used to manage VoIP services over the cable network. RDC 1 128, which is associated with modem 105, MTA 110, and MTS 120 supports a softswitch 130 that manages and maintains a call state for VoIP services provided to telephone 100. While softswitch 130 is illustrated as residing within RDC 1 128, this is not meant as a function limitation. Softswitch 130 may be located outside RDC 1 128 and connected to it via a network segment such as a managed IP network 115.

MTA 110 is registered with softswitch 130. A telephone number assigned to a subscriber is associated at softswitch 130 with a fully qualified domain name (FQDN) of MTA 110.

A dynamic host configuration protocol (DHCP) server 140 provides functionality for provisioning or configuring MTAs and other communication devices for communication over the network. DHCP server 140 provisions MTA 110 with an IP address and an FQDN at boot up. The IP address and its associated FQDN for MTA 110 are stored in domain name server (DNS) 135 using dynamic DNS (DDNS). DNS 135 supports lookup requests from network devices based on either the IP address or the FQDN. By way of illustration and not as a limitation, a lookup request may be received by a softswitch 130, a network monitoring system (not illustrated), or by a provisioning system (not illustrated).

Using DDNS for MTA IP lookup in a large multi-system network exposes the VoIP service to the following limitations of current domain name look-up methodology. In a typical domain name look-up system, the DCHP server 140 dynamically updates DNS 135 with information relating the IP and FQDN assigned to MTA 110. However, if DNS 135 is unavailable for any reason, there is no assurance that an updated IP and FQDN for MTA 110 or modem 105 (or other end-point) will be stored in DNS 135. Additionally, in a DDNS system, the DHCP server 140 will queue the updated MTA 110 records for a fixed period of time. If the DNS 135 has not recovered before that fixed period of time has expired, the DHCP server 140 must "choose" to either cease issuing leases or the queue will be emptied. A request for the IP address of MTA 110 by softswitch 130 may then be fulfilled with the last record held by DNS 135. Consequently, a lookup is not always performed in real-time. Additionally, once DNS 135 loses synchronization, there is no way to resynchronize the data without rebooting all of the devices to obtain new leases.

Cable operators provide VoIP over a hybrid-fiber-coaxial (HFC) network in accordance with standards issued by CableLabs. The telephone call data is provided as packets over the high speed data path that also provides Internet connectivity. VoIP can also be provided over a fiber optic network.

DETAILED DESCRIPTION

In an embodiment, a MAC-to-IP system receives IP and/or MAC lease information of end-point devices from one or more DHCP servers providing services to a region of a multi-system subscriber access network (SAN). For example, a SAN may be a cable network operating over a hybrid fiber coax (HFC) network or fiber to the curb network. The lease information includes the MAC and IP addresses of end-point devices that can be provisioned by a DHCP server serving the particular region as well as lease expiration information (i.e., time and date). The lease information can be extracted from issued leases and does not affect the issuance of leases by the DHCP server.

In the following discussion, an exemplary embodiment is described in terms of a voice-over-IP (VoIP) service offered over an HFC cable network. However, this is illustrative only and is not meant as a limitation. The described structures and processes apply to SANs operated over any media having end-points that are provisioned for communication over the SAN and that require identification in real-time by systems used to provide services to subscribers via the SAN.

Figure 1:
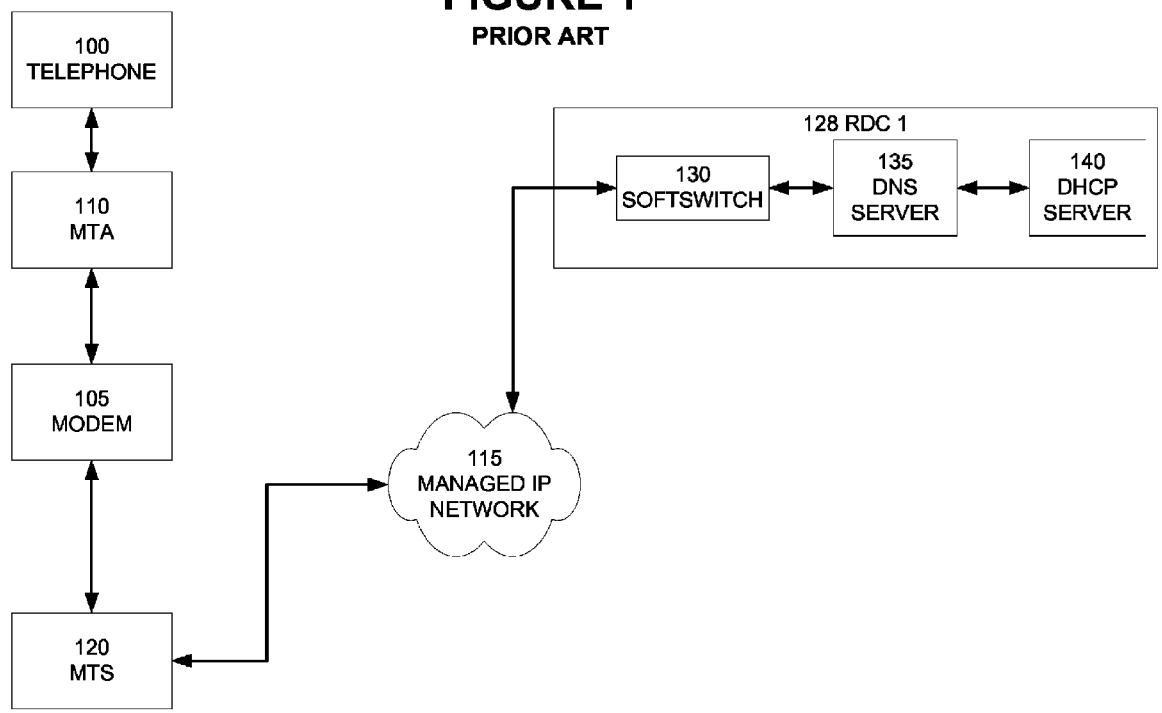
FIG. 1 illustrates the logical elements of a subscriber access network.
Figure 2:
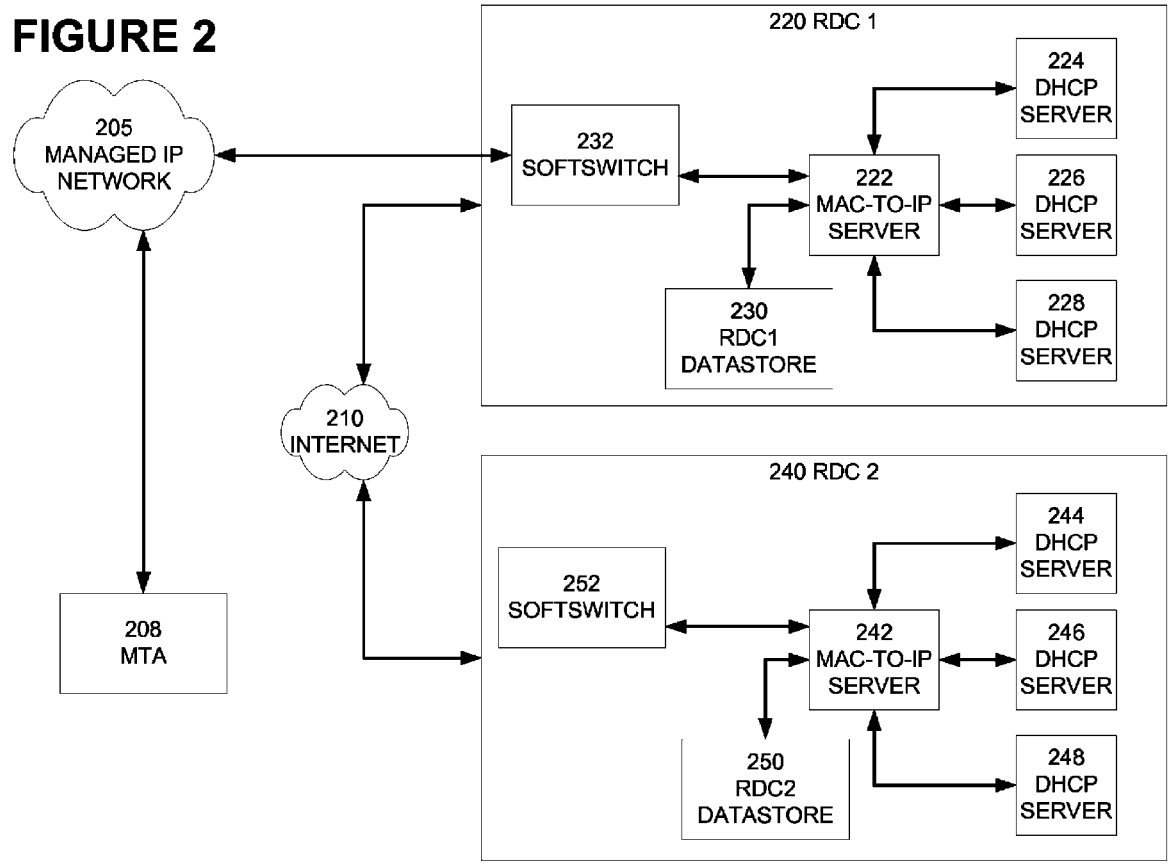
FIG. 2 illustrates an implementation using a MAC-to-IP look-up system according to an embodiment hereof.

FIG. 2 illustrates a VoIP service provided over an HFC cable network using a MAC-to-IP server according to an exemplary embodiment. In this exemplary embodiment, the SAN illustrated in FIG. 1 comprises an HFC cable network that utilizes MTAs, cable modems, and cable modem termination systems to provide a VoIP service.

In a VoIP service, a softswitch identifies an MTA by its FQDN. The FQDN is in the form of {Host MAC Address}.{Region Domain Name}. When a softswitch requires the IP address of a particular MTA, the softswitch uses the FQDN of the MTA to obtain the MAC address of the MTA. The softswitch generates an IP address lookup query and directs it to a MAC-to-IP server associated with the softswitch. The query contains the MAC address of the MTA. The MAC-to-IP server associated with the softswitch receives the query, searches through stored lease data for the MAC address and reports back to the softswitch the IP address associated with the MTA.

MAC-to-IP server 222 in RDC 1 220 receives lease information from DHCP servers 224, 226, and 228. At a minimum, this information comprises the leased IP address, the MAC address, and the lease expiration date and time of network devices served by RDC 1 220. The MAC-to-IP server 222 extracts these data, associates them, and stores them in RDC 1 datastore 230. Softswitch 232 operates within RDC 1 220 and is illustrated as connecting to MTA 208 via managed IP network 205.

Similarly, the MAC-to-IP server 242 in RDC 2 240 receives lease information from DHCP servers 244, 246, and 248. At a minimum, this information comprises the leased IP address, the MAC address, and the lease expiration date and time of network devices served by RDC 2 240. The MAC-to-IP server 242 extracts these data, associates them, and stores them in RDC 2 datastore 250.

In an embodiment, the RDC datastores 230 and 250 are custom-threaded applications that collect and store MAC to IP correlation information and lease information in a memory resident database. Each database is indexed using an optimized open source dynamic array library that allows for extremely fast searches and insertion. The database is stored in memory to facilitate the fastest possible searches and updates.

The use of lease information to populate RDC 1 datastore 230 and RDC 2 datastore 250 significantly improves the reliability of the data used to respond to lookup requests from softswitch 252. Because the lease information is retained by the DHCP servers, it is always available to reconstruct a failed datastore. That is, if the MAC-to-IP server fails, the RDC datastore may be reconstructed by requesting lease information from each of the DHCP servers providing service to devices serviced by a particular RDC without affecting the issuance of leases by the DHCP servers and without requiring devices to obtain new leases.

In addition, because the MAC-to-IP server is made aware of the expiration date and time of an IP lease, the MAC-to-IP server is able to delete expired records from its associated RDC datastore. In contrast, DNS-based systems will maintain expired data until a record removal message is sent, thus increasing the risk that the IP address returned in response to a request will be incorrect.

Referring again to FIG. 2, MTA 208 communicates with softswitch 232 via managed IP network 205. For example, when softswitch 232 receives a call directed to a telephone number associated with MTA 208, softswitch 232 must "know" the IP address of MTA 208 in order to establish a connection with a telephone (see FIG. 1, element 100) connected to MTA 208. Softswitch 232 uses the called telephone number to look up the FQDN of MTA 208. Softswitch 232 then sends an IP lookup query to MAC-to-IP server 222. The IP lookup query includes the MAC address of MTA 208.

MAC-to-IP server 222 queries RDC 1 datastore 230 for the IP address associated with the MAC address of MTA 208. If the IP address is found, it is returned to softswitch 232. In this example, softswitch 232 uses the IP address of MTA 208 to send signaling information to MTA 208.

The logical elements illustrated in FIG. 2 may also be used to respond to lookup requests from other components of the HFC network. For example, a monitoring system (not illustrated) may detect an IP address from a packet and need to determine the MAC address of the source of the packet. In this situation, the MAC-to-IP server 222 would query RDC 1 datastore 230 for the MAC address associated with the IP address of the device from which the packet in question originated.

Figure 3:
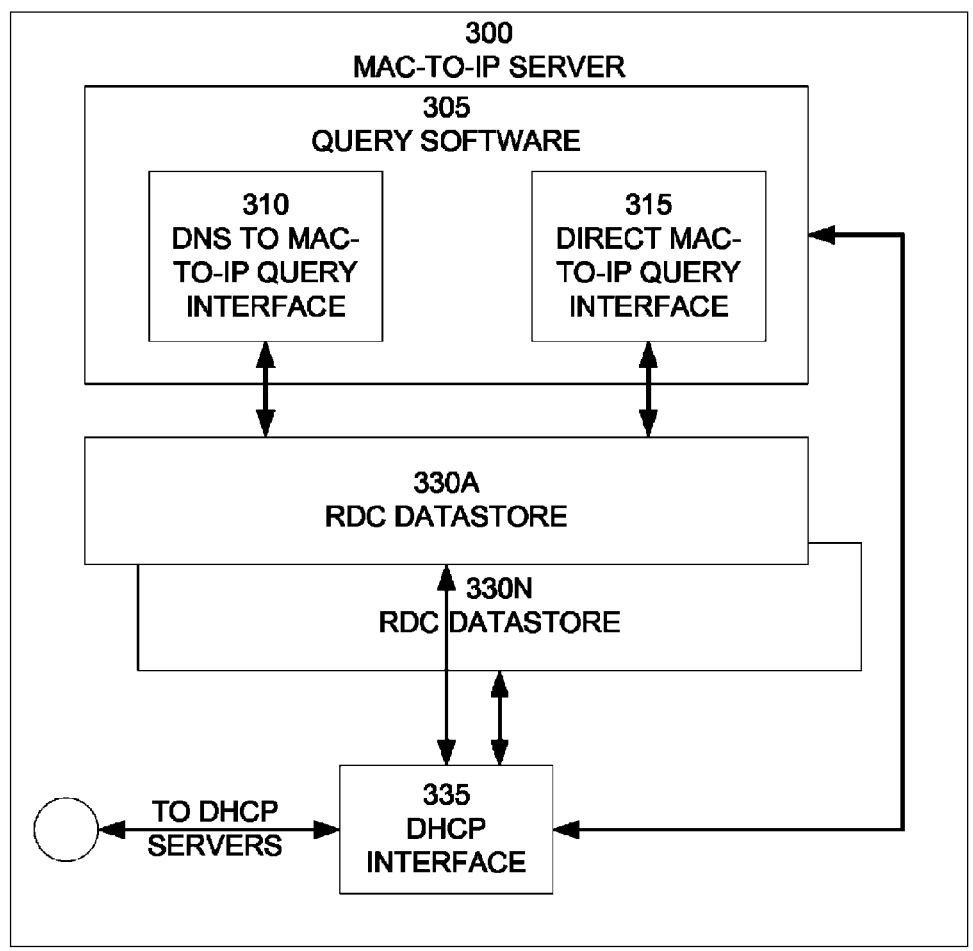
FIG. 3 illustrates the logical components of a MAC-to-IP look-up system according to an embodiment hereof.

FIG. 3 illustrates the logical components of a MAC-to-IP server according to an embodiment. MAC-to-IP server 300 comprises query software 305, lease datastores 330A and 330N, and DHCP interface 335.

Query software 305 comprises a DNS MAC-to-IP query interface 310 and a direct MAC-to-IP query interface 315. The query software interfaces 310 and 315 are connected to the Internet (not illustrated).

The DNS MAC-to-IP query interface 310 comprises instructions that permit DNS-based lookup systems to send DNS messages to MAC-to-IP server 300. In this mode of operation, the DNS MAC-to-IP query interface 310 responds to the DNS searches by providing an interface for receiving query parameters in a format that is utilized by DNS-based lookup systems. This method of searching the database is provided so that systems that use DDNS to map MAC addresses to IP addresses (as, for example, most softswitches) can be modified to communicate with the MAC-to-IP server 300 without modification.

Direct MAC-to-IP query interface 315 provides an interface for receiving queries that are structured to allow searches that return multiple results. For example, a query for information related to an MTA would return all the relevant records associated with the MTA's MAC address. A user of the direct MAC-to-IP query interface 315 may also structure a search to return only specific information about a device.

DHCP interface 335 comprises instructions for communicating with DHCP servers (such as DHCP servers 224, 226, and 228 illustrated in FIG. 2). In an embodiment, if the IP address is not found, query software 305 may query a DHCP server for lease information relating to the MAC address of a network device.

FIG. 3 also illustrates redundant RDC datastores 330A and 330N. If a query directed to one datastore cannot be fulfilled, the query may be sent to any other datastore to determine if the requested data is available there. If the data is not found, the DHCP servers will be queried and the datastores updated. If the data is found in one datastore but not another, the datastore that did not have the requested data will be updated.

It will be understood by those skilled in the art that the present invention may be, without limitation, embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the," is not to be construed as limiting the element to the singular. Moreover, a reference to a specific time, time interval, and instantiation of scripts or code segments is in all respects illustrative and not limiting.

What is claimed is:

1. A lookup request fulfillment system comprising:
   a network;
   a MAC-to-IP server device connected to the network;
   a memory accessible to the MAC-to-IP server device via the network and wherein the memory comprises a MAC-to-IP datastore, and
   wherein the MAC-to-IP server device comprises instructions for:
      receiving lease information from a DHCP server device for a network end-point (NEP), wherein the lease information comprises a MAC address, an IP address, and lease expiration information;
      creating a lease record comprising the lease information;
      storing the lease record in the MAC-to-IP datastore;
      deleting the lease record from the MAC-to-IP datastore upon lease expiration;
      receiving a DNS lookup request from a network device via the network;
      converting the DNS lookup request into a MAC-to-IP datastore query;
      obtaining data from the MAC-to-IP datastore to fulfill the DNS lookup request;
      creating a DNS lookup response from the data obtained from the MAC-to-IP datastore, wherein the DNS lookup response is presented in the form of a DNS message; and
      sending the DNS lookup response to the network device.

2. The system of claim 1, wherein the MAC-to-IP server device further comprises instructions for:
   determining that the data to fulfill the DNS lookup request are not available from the MAC-to-IP datastore;
   querying the DHCP server device to determine if lease information for the NEP identified in the DNS lookup request is available; and
   if the lease information for the NEP is available, obtaining the lease information from the DHCP server device.

3. The system of claim 1, wherein the DNS lookup request comprises providing an IP address of the NEP and requesting a MAC address of the NEP.

4. The system of claim 1, wherein the DNS lookup request comprises providing the MAC address of the NEP and requesting the IP address of the NEP.

5. The system of claim 1, wherein the DNS lookup request is presented in the form of a DNS message.

6. The system of claim 1, wherein the NEP is selected from the group consisting of a media terminal adapter, a modem, and a home gateway.

7. A method for fulfilling a lookup request comprising:
   receiving at a MAC-to-IP server device lease information from a DHCP server device for a network end-point (NEP) wherein the lease information comprises a MAC address, an IP address, and lease expiration information;
   creating at the MAC-to-IP server device a lease record comprising the lease information;
   storing the lease record in a MAC-to-IP datastore, wherein the MAC-to-IP datastore is stored in a memory;
   deleting the lease record from the MAC-to-IP datastore upon reaching lease expiration;
   receiving at the MAC-to-IP server device a DNS lookup request from a network device via a network;
   converting at the MAC-to-IP server device the DNS lookup request into a MAC-to-IP datastore query;
   obtaining data at the MAC-to-IP server device from the MAC-to-IP datastore to fulfill the DNS lookup request;
   creating at the MAC-to-IP server device a DNS lookup response from the data obtained from the MAC-to-IP datastore, wherein the DNS lookup response is presented in the form of a DNS message; and
   sending from the MAC-to-IP server device the DNS lookup response to the network device.

8. The method of claim 7 further comprising:
   determining that the data to fulfill the DNS lookup request are not available from the MAC-to-IP datastore;
   querying the DHCP server device to determine if lease information for the NEP identified in the DNS lookup request is available; and
   if the lease information for the NEP is available, obtaining the lease information from the DHCP server device.

9. The method of claim 7, wherein receiving a DNS lookup request comprises receiving an IP address of the NEP and requesting a MAC address of the NEP.

10. The method of claim 7, wherein a DNS lookup request comprises receiving the MAC address of the NEP and requesting the IP address of the NEP.

11. The method of claim 7, wherein the DNS lookup request is presented in the form of a DNS message.

12. The method of claim 7, wherein the NEP is selected from the group consisting of a media terminal adapter, a modem, and a home gateway.

* * * * *